US010737539B2

(12) United States Patent
Ruegg, Jr. et al.

(10) Patent No.: US 10,737,539 B2
(45) Date of Patent: Aug. 11, 2020

(54) METHOD AND APPARATUS FOR MAKING A COMPARTMENTALIZED TIRE SEALANT STRIP (71) Applicant: The Goodyear Tire & Rubber Company, Akron, OH (US)

(72) Inventors: Michael Charles Ruegg, Jr., Akron, OH (US); Ernest Wilford Looman, Jr., Tallmadge, OH (US); Donald Edward Helle, Topeka, KS (US); Patrick David Marks, Uniontown, OH (US); Thomas Roy Fuhrig, North Canton, OH (US); Joseph Alan Incavo, The Woodlands, TX (US); James Earl Koerner, Uniontown, OH (US); Terrence Lee Parsons, North Canton, OH (US); Charles Kenneth Schmalix, Canal Fulton, OH (US); Warren James Busch, North Canton, OH (US); Timothy Patrick Lovell, Uniontown, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 398 days.

(21) Appl. No.: 15/808,381

(22) Filed: Nov. 9, 2017

(65) Prior Publication Data
US 2018/0079264 A1 Mar. 22, 2018

Related U.S. Application Data (62) Division of application No. 14/073,224, filed on Nov. 6, 2013, now Pat. No. 9,844,982, which is a division
(Continued)

(51) Int. Cl.
*B29C 48/19* (2019.01)
*B29C 48/20* (2019.01)
(Continued)

(52) U.S. Cl.
CPC .............. *B60C 19/12* (2013.01); *B29C 48/08* (2019.02); *B29C 48/19* (2019.02); *B29C 48/20* (2019.02);
(Continued)

(58) Field of Classification Search
CPC ......... B29C 48/07; B29C 48/08; B29C 48/12; B29C 48/19; B29C 48/20; B29C 48/2566;
(Continued)

(56) References Cited

U.S. PATENT DOCUMENTS 1,643,848 A 9/1927 Hibbert
1,959,460 A 5/1934 Crossan
(Continued)

FOREIGN PATENT DOCUMENTS

EP 1270174 1/2003
EP 2072221 6/2006
(Continued)

*Primary Examiner* — Xiao S Zhao
*Assistant Examiner* — Joseph S Leyson
(74) *Attorney, Agent, or Firm* — David L. King (57) ABSTRACT A method for making a compartmentalized sealant strip and barrier assembly 10 has the steps of co-extruding a barrier strip 9 of non-sealant elastomeric material with a plurality of projecting linear extending walls 9c and a sealant strip 11 wherein the sealant strip 11 is formed on one side of the barrier strip 9 filling the space between the plurality of projecting walls 9c to form a plurality of linearly extending rows of sealant 11 across the transverse width of the co-extrusion to form the compartmentalized sealant strip and barrier assembly 10. The step of co-extruding may further include the step of: forming the projecting walls 9c on an
(Continued)

inclined angle relative to a plane perpendicular to the width of the assembly 10. The step of co-extruding further has the step of forming the barrier strip 9 with lateral edges 9a and 9c that extend beyond the lateral outermost sealant strips 11 on each side of the assembly 10, the lateral edges 9a, 9b being bonding surfaces to seal the sealant strip and barrier assembly 10 into an uncured rubber layer when assembled into an unvulcanized tire 2.

3 Claims, 7 Drawing Sheets

Related U.S. Application Data of application No. 13/230,174, filed on Sep. 12, 2011, now Pat. No. 8,617,334.

(51) Int. Cl.
| | |
|---|---|
| *B29C 48/305* | (2019.01) |
| *B60C 19/12* | (2006.01) |
| *B29C 48/08* | (2019.01) |
| *B29C 48/30* | (2019.01) |
| *B29C 73/16* | (2006.01) |
| *B29C 73/22* | (2006.01) |
| *B29D 30/06* | (2006.01) |
| *B29C 48/07* | (2019.01) |
| *B29C 48/12* | (2019.01) |

(52) U.S. Cl.
CPC ............ *B29C 48/30* (2019.02); *B29C 48/307* (2019.02); *B29C 73/163* (2013.01); *B29C 73/22* (2013.01); *B29D 30/0685* (2013.01); *B29C 48/07* (2019.02); *B29C 48/12* (2019.02); *B29D 2030/0689* (2013.01); *Y10T 152/10666* (2015.01); *Y10T 152/10693* (2015.01); *Y10T 428/24479* (2015.01); *Y10T 428/24612* (2015.01)

(58) Field of Classification Search
CPC ......... B29C 48/30; B29C 48/307; B60C 9/12; B60C 9/122
See application file for complete search history.

(56) References Cited

U.S. PATENT DOCUMENTS

| | | | |
|---|---|---|---|
| 2,244,648 | A | 6/1941 | Carnahan |
| 2,345,200 | A | 3/1944 | Iknayan |
| 2,877,819 | A | 3/1959 | Gibbs |
| 3,444,918 | A | 5/1969 | Goggins |
| 3,563,294 | A | 2/1971 | Chien |
| 3,903,947 | A | 9/1975 | Emerson |
| 4,140,167 | A | 2/1979 | Bohm |
| 4,171,237 | A | 10/1979 | Anderson |
| 4,206,796 | A | 6/1980 | Chemizard |
| 4,209,796 | A | 6/1980 | Senturia |
| 4,256,158 | A | 3/1981 | Chautard |
| 4,286,643 | A | 9/1981 | Chemizard |
| 4,388,261 | A * | 6/1983 | Codispoti .......... B29D 30/0685 264/174.11 |
| 4,664,168 | A | 5/1987 | Hong |
| 5,800,903 | A | 9/1998 | Wood |
| 6,746,227 | B2 | 6/2004 | Helle |
| 6,915,826 | B2 | 7/2005 | Poling |
| 7,040,364 | B2 | 5/2006 | Nakakita |
| 7,607,466 | B2 | 10/2009 | Kim |
| 8,221,573 | B2 | 7/2012 | Lammlein |
| 2005/0208167 | A1* | 9/2005 | You ........................ B60C 19/08 425/133.5 |
| 2006/0169393 | A1 | 8/2006 | Botts |
| 2008/0142140 | A1 | 6/2008 | Marks |
| 2008/0264536 | A1 | 10/2008 | Yamagiwa |
| 2009/0159182 | A1 | 6/2009 | Lammlein |
| 2012/0132330 | A1* | 5/2012 | Sandstrom ............. B29C 48/12 152/209.5 |

FOREIGN PATENT DOCUMENTS

| | | |
|---|---|---|
| EP | 1932655 | 6/2008 |
| EP | 2174770 | 9/2009 |
| JP | S5345803 | 4/1978 |
| JP | 62236710 | 10/1987 |
| JP | 2002059722 | 2/2002 |
| JP | 20030334868 | 11/2003 |
| JP | 20060142925 | 6/2006 |

* cited by examiner

METHOD AND APPARATUS FOR MAKING A COMPARTMENTALIZED TIRE SEALANT STRIP

RELATED APPLICATIONS

This application is a divisional of U.S. application Ser. No. 14/073,224 entitled "Method And Apparatus For Making A Compartmentalized Tire Sealant Strip" filed on Nov. 6, 2013.

TECHNICAL FIELD

This invention relates to a method and apparatus for making a puncture sealant strip assembly for use in a tire. More particularly a compartmentalized sealant strip assembly formed as an extruded strip.

BACKGROUND OF THE INVENTION

It is known in the prior art to apply puncture sealants made of puncture sealing rubber or plastic material on the crown portion of the tire so that when a sharp object such as a nail pierces the tire, the tire sealant forms a seal around the puncture. Tire sealants of this nature tend to flow or be soft resulting in a tendency to migrate towards the center portion of the tire due to centrifugal force as the tire is rotated at high speeds. Thus the outer portions of the crown have reduced sealant volume due to migration of the sealant towards the center. It is known in the prior art to compartmentalize a sealant into multiple cells such as shown in U.S. Pat. Nos. 2,877,819, 4,388,261. One disadvantage to compartmentalizing the sealant into multiple cells is that the manufacturing process is costly. Further, having too many compartments may impede the effective flow of the sealant needed to seal a puncture. Further, it was conventional wisdom that using an extruder to manufacture the sealant into compartments is costly and requires additional manufacturing steps.

In US patent publication 2009/0159182 A1 published Jun. 25, 2009 Robert Lammlein Jr. proposed an apparatus employing conveyor and strip applying devices to assemble three or more sealant strips in an assembly having sealant material in strips with non-sealant dividers separating the strip of sealant. This publication, "Method and Apparatus For Building A Puncture Sealant Preassembled Component" was believed to be a simple way to assemble the sealant into a partitioned strip of sealant as a preassembled component. Once built, the assembly could be delivered to a tire building machine to be used in the manufacture of a self-sealing tire. Mr. Lammlein's invention achieved a partitioned sealant layer by the use of an apparatus employing conveyors and strip appliers to attach divider strips between adjacent sealant strips.

Similarly in JP 2006-14925, slits were cut into a sealant strip and non-sealant rubber dividers were placed in the slits to achieve a similar result.

In JP 2003-334868 an upper or lower non-sealant layer with a plurality of projecting walls was used to form partitions as circumferential ribs to divide the sealant into hoop like annular rings about the tire or alternatively will transverse and circumferential partition walls to form numerous cells of sealant material. A rather large and not easily overcome difficulty in this sealant strip assembly was removal of entrapped air. As every tire builder can easily appreciate having pockets of air in an uncured green tire can cause large problems during high temperature curing. Great care is taken to avoid entrapped air and therefore most tire builders would want to avoid any assembly that promotes the occurrence of entrapped air.

In all the prior art attempts to use sealants in tires it has been a goal to minimize the amount of sealant material used to keep tire weight increases to a minimum. This is important as the added weight tend to increase tire heat build-up during driving and tends to increase the vehicle's fuel consumption. Accordingly, engineers have been working hard to provide a self-sealing tire resistant to punctures, but without decreasing the tire uniformity or performance.

A second objective is to provide this self-sealing feature at a very low additional cost. For the most part of a tire's useful life, flats are not that common an occurrence, but when they occur, it is almost always at a most inconvenient time for the driver. Many vehicles have air pressure sensors mounted in the wheels to alert the driver to seek assistance and repair. Some vehicles are equipped with self-supporting runflat tires with reinforced sidewalls, but these are rather costly. The sealant tire is a good reliable lower cost solution that won't sustain tire pressure on large openings, but will certainly keep a tire from losing air pressure from a nail or screw puncture. These punctures are generally the most common cause of flat tires and for the typical vehicle a sealant or self-sealing tire is the best insurance against tire punctures because it is believed the most affordable solution.

The present invention as described as follows provides what is believed to be a most cost efficient approach to manufacturing a compartmentalized sealant strip assembly.

SUMMARY OF THE INVENTION

A method for making a compartmentalized sealant strip and barrier assembly has the steps of co-extruding a barrier strip of non-sealant elastomeric material with a plurality of projecting linear extending walls and a sealant strip wherein the sealant strip is formed on one side of the barrier strip filling the space between the plurality of projecting walls to form a plurality of linearly extending rows of sealant across the transverse width of the co-extrusion to form the compartmentalized sealant strip and barrier assembly. The step of co-extruding may further include the step of: forming the projecting walls on an inclined angle relative to a plane perpendicular to the width of the strip. In a preferred method for making a compartmentalized sealant strip and barrier assembly, the co-extruded sealant strip and barrier assembly has a center plane perpendicular to the width of the strip and the projecting walls are inclined from the barrier strip extending laterally outwardly away from the center plane to form a sealant barrier wall to prevent sealant migration toward the center plane of the sealant strip and barrier assembly. The step of co-extruding further has the step of: forming the barrier strip with lateral edges that extend beyond the lateral outermost sealant strips on each side of the assembly, the lateral edges being bonding surfaces to seal the sealant strip and barrier assembly into an uncured rubber layer when assembled into an unvulcanized tire. The barrier strip of the assembly is formed as a co-extrusion to be a top layer overlaying the compartmentalized sealant strips when the assembly is built into a tire. The inclined barrier walls are co-extruded extending a depth between 50 to 100 percent of the thickness of the sealant strips, preferably the inclined walls extend to a depth equal to the thickness of the sealant strips.

The invention includes an intermediate article of manufacture formed as a preassembly of a co-extruded compartmentalized sealant strip and barrier strip assembly which has a co-extrusion of a barrier layer or strip of non-sealant elastomeric material having a plurality of projecting linearly extending barrier walls formed on one side of the barrier strip; and a co-extrusion of a plurality of linearly extending rows of sealant of a thickness at least filling spaces between the barrier walls of the barrier strip, the combination forming the compartmentalized sealant strip and barrier assembly. The projecting barrier walls extend from the one side of the barrier strip to a depth between 50 to 100 percent of the thickness of the sealant strips. The thickness of the sealant strips is between 0.5 to 2 cm. The projecting barrier walls are inclined relative to a plane perpendicular to a width of the strip and barrier assembly. The co-extruded assembly has a center plane perpendicular to the width of the assembly and the projecting walls are inclined from the barrier strip extending laterally outwardly away relative to the center plane to form a sealant barrier to prevent sealant migration toward the center plane of the assembly. The barrier strip has a pair of lateral edges, each lateral edge extends laterally beyond the lateral outermost sealant strip on each side of the assembly, the lateral edges having a width which provides a bonding surface to seal the sealant and barrier assembly to an uncured rubber layer when assembled into an unvulcanized tire. The barrier strip of the assembly is a top or a radially outer layer or a radially outer layer of the compartmentalized sealant strip and barrier assembly when built into a tire. The barrier strip has a layer thickness of 1 mm to 4 mm and the projecting barrier walls have a thickness equal to or less than the thickness of the layer thickness. The barrier walls preferably extend to the full thickness of the sealant strips and have exposed ends.

The sealant is preferably comprised of, based upon parts by weight per 100 parts by weight of said partially depolymerized butyl rubber exclusive of carbon black: (A) a partially organoperoxide-depolymerized butyl rubber as a copolymer of isobutylene and isoprene, wherein said butyl rubber, prior to such depolymerization, is comprised of about 0.5 to about 5 percent units derived from isoprene, and correspondingly from about 95 to about 99.5 weight percent units derived from isobutylene; (B) particulate reinforcing filler comprised of: (1) about 20 to about 50 phr of synthetic amorphous silica, or (2) about 15 to about 30 phr synthetic amorphous silica, preferably precipitated silica, and about 5 to about 20 phr of clay, or (3) about 15 to about 30 phr synthetic amorphous silica and about 5 to about 20 phr of calcium carbonate, or (4) about 15 to about 30 phr synthetic amorphous silica, about 5 to about 15 phr of clay and about 5 to about 15 phr of calcium carbonate; (C) from zero to 6 phr of short organic fibers; (D) a colorant of other than a black color wherein said colorant is selected from at least one of organic pigments, inorganic pigments and dyes; and (F) from zero to about 20 phr of rubber processing oil.

This preassembly allows an inventive tire to be assembled. This sealant tire has a pair of annular beads; a pair of elastomeric apexes, one apex above each bead; at least one carcass ply extending between and wrapped about each bead; a belt reinforcing structure overlaying the carcass; a tread overlaying the belt reinforcing structure; an air impervious inner liner extending between the beads underlying the carcass for forming an air chamber; and a compartmentalized sealant strip and barrier assembly positioned between the carcass and inner liner under the belt reinforcing structure. The compartmentalized sealant strip and barrier assembly is a co-extrusion of a co-extrusion of barrier strips of non-sealant elastomeric material having a plurality of projecting linearly extending barrier walls formed on one side of the barrier strip. A co-extrusion of a plurality of linearly extending rows of sealant to a thickness at least fills spaces between the barrier walls of the barrier strip. The combination forms the compartmentalized sealant strip and barrier assembly. The preassembly of the strip is achieved by a unique die for forming the barrier and sealant assembly.

DEFINITIONS

As used herein and in the claims,

"Aspect Ratio" means the ratio of a tire's section height to its section width.

"Axial" and "axially" mean the lines or directions that are parallel to the axis of rotation of the tire.

"Carcass" means a laminate of tire ply material and other tire components cut to length suitable for splicing, or already spliced, into a cylindrical or toroidal shape.

Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Laminate structure" means an unvulcanized structure made of one or more layers of tire or elastomer components such as the inner liner, sidewalls, and optional ply layer.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Sidewall" means a portion of a tire between the tread and the bead.

"Skive" or "skive angle" refers to the cutting angle of a knife with respect to the material being cut; the skive angle is measured with respect to the plane of the flat material being cut.

BRIEF DESCRIPTION OF THE DRAWINGS

The structure, operation, and advantage of the invention will become further apparent upon consideration of the following description taken in conjunction with the accompanying drawings wherein.

DETAILED DESCRIPTION OF THE INVENTION

Figure 1:
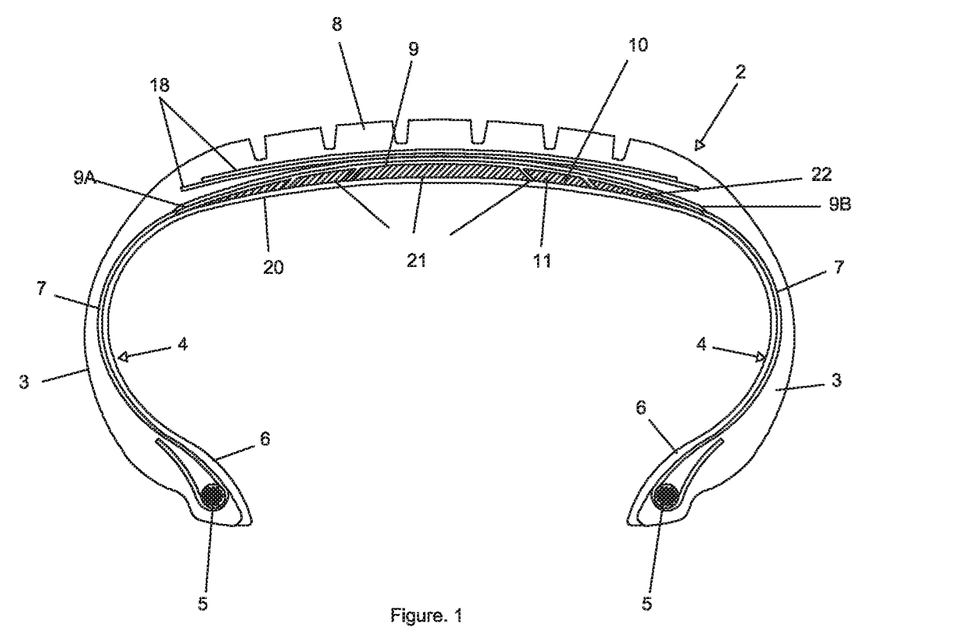
FIG. 1 is a schematic view of a cross section of tire with a sealant compartmentalized strip made in accordance with the present invention.

Referring now to FIG. 1, there is illustrated a cross-sectional view of a self-sealing pneumatic tire constructed in accordance with the invention. The tire may be any type of tire. For example, a truck tire, a light truck tire or a passenger tire. The tire 2 includes sidewalls 3, a supporting tire carcass 4, a pair of beads 5, an inner liner 6, a layer of the compartmentalized sealant strip and barrier assembly 10 of the present invention, and an outer circumferential tread 8. The sidewalls 3 extend radially inward from the axial outer edges of the tread portion 8 to join the respective beads. The carcass 4 acts as a support structure for the tread and sidewalls, and is comprised of one or more layers of cord reinforced ply 7. The compartmentalized sealant strip and barrier assembly 10 is shown disposed between the inner liner 6 and an elastomeric cover layer such as for example, a rubber layer, the ply layer 7 or an optional additional barrier layer. The barrier layer or strip 9 of the assembly 10 has a width sized to cover the sealant strip layers 11 such as from shoulder to shoulder, or may further extend down into the bead area between the ply and inner liner. The sealant assembly may also be disposed at different locations such as the sidewall region. The tread region 8 forms a crown region of the carcass. In the interior region of the tread, there is generally found one or more belts 18. The surface region of the tread forms a tread pattern.

The sealant strips 11 may be made from any suitable sealant composition known to those skilled in the art, such as rubber or elastomer compositions and plastic compositions. One suitable polymer composition suitable for use is described in U.S. Pat. No. 4,895,610, the entirety of which is incorporated by reference. The polymer compositions described therein include the following composition by weight: 100 parts of a butyl rubber copolymer, about 10 to about 40 parts of carbon black, about 5 to about 35 parts of an oil extender, and from about 1 to 8 parts of a peroxide vulcanizing agent. A second polymer composition includes the following composition by weight: 100 parts of a butyl rubber copolymer, about 20 to about 30 parts of carbon black, about 8 to about 12 parts of an oil extender, and from about 2 to 4 parts of a peroxide vulcanizing agent.

The sealant strips 11 may also comprise a colored polymer composition as described in U.S. Pat. No. 7,073,550, the entirety of which is incorporated herein by reference. The colored polymer composition is comprised of, based upon parts by weight per 100 parts by weight of said partially depolymerized butyl rubber exclusive of carbon black: (A) a partially organoperoxide-depolymerized butyl rubber as a copolymer of isobutylene and isoprene, wherein said butyl rubber, prior to such depolymerization, is comprised of about 0.5 to about 5, preferably within a range of from 0.5 to one, percent units derived from isoprene, and correspondingly from about 95 to about 99.5, preferably within a range of from 99 to 99.5, weight percent units derived from isobutylene; (B) particulate reinforcing filler comprised of: (1) about 20 to about 50 phr of synthetic amorphous silica, preferably precipitated silica, or (2) about 15 to about 30 phr synthetic amorphous silica, preferably precipitated silica, and about 5 to about 20 phr of clay, preferably kaolin clay, or (3) about 15 to about 30 phr synthetic amorphous silica, preferably precipitated silica, and about 5 to about 20 phr of calcium carbonate, (4) about 15 to about 30 phr synthetic amorphous silica, preferably precipitated silica, about 5 to about 15 phr of clay, preferably kaolin clay, and about 5 to about 15 phr of calcium carbonate; (C) from zero to 6, alternately about 0.5 to about 5, phr of short organic fibers (D) a colorant of other than a black color wherein said colorant is selected from at least one of organic pigments, inorganic pigments and dyes, preferably from organic pigments and inorganic pigments; (E) from zero to about 20, alternately about 2 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent.

Another sealant polymer composition which may be utilized by the invention is described in U.S. Pat. No. 6,837,287, the entirety of which is hereby incorporated by reference.

Further, any sealant polymer composition may also be used with the invention that has a polymer composition of butyl rubber and an organoperoxide vulcanizing agent which becomes activated at high temperatures above 100 degrees C.

FIG. 1 illustrates one example of a sealant configuration for a tire. The sealant strips 11 are comprised of two or more zones, preferably two or more axially outer zones 20, 22 located between the shoulder portion and the center portion of the tire and one or more axially inner zones 21 located in the center portion of the tire 2.

The thickness of the sealant in each of the zones 20, 21 and 22 can vary greatly in an unvulcanized puncture sealant-containing tire. Generally, the thickness of the sealant composition layer may range from about 0.13 cm (0.05 inches) to about 1.9 cm (0.75 inches). In passenger and truck tires it is normally desired for the sealant composition layer to have a thickness of about 0.32 cm (0.125 inches). The sealant width may vary depending upon the tire size, but may typically be in the range of 1 to 6 inches (2.5 cm to 15 cm).

After the unvulcanized pneumatic rubber tires of this invention are assembled they are vulcanized using a normal tire cure cycle. The tires of this invention can be cured over a wide temperature range depending somewhat upon the size of the tire and the degree of desired depolymerization of the butyl rubber as well as the thickness of the sealant layer itself) and sufficient to at least partially depolymerize said sealant precursor layer to the aforesaid storage modulus (G') physical property.

Figure 2:
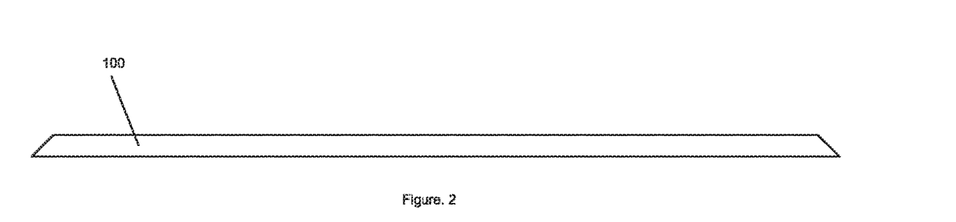
FIG. 2 is a cross sectional view of a prior art sealant.

With reference to FIG. 2, a prior art sealant is illustrated as a strip 100 which has been extruded having a width and a thickness sufficient to provide a puncture sealing layer in a tire to prevent air loss from nails or screws. As shown this prior art extrusion of the strip 100 would be formed as a single layer extrusion and then additional layers of material would be used to encapsulate it during the tire building process.

Figure 3A:
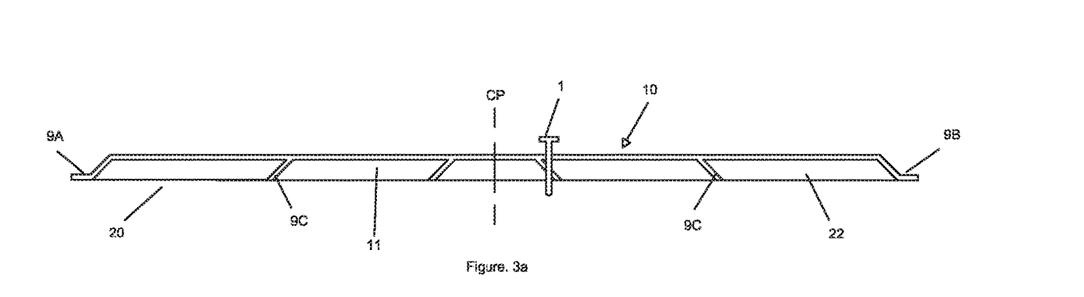
FIG. 3a is a cross sectional view of a first embodiment of the compartmentalized sealant strip and barrier assembly.

With reference to FIG. 3a, the compartmentalized tire sealant strip and barrier assembly 10 is illustrated. The sealant strip and barrier assembly 10 is shown with a nail 1 puncturing the sealant strip 11. As shown, there is a barrier layer 9 extending from lateral edges 9a, 9b and above the sealant strips 20, 21, 22. This barrier layer or strip 9 has a plurality of barrier walls 9c shown extending from the barrier strip through and dividing various strips of sealant material. As shown, the axially outer sealant strips 20 and 22 are shown as well as the intermediate sealant strips 21. As illustrated, the barrier walls 9c are inclined relative to a center plane (cp) of the co-extrusion assembly 10. In such a way that the barrier walls 9c extend outwardly from the barrier layer 9 through the sealant strips 11 to an end 9d. As shown, the barrier walls 9c can be inclined extending the full depth of the sealant strip 11. Alternatively, it is sufficient if the barrier walls 9c only extend 50 to 100 percent of the thickness of the sealant material. This is true because during circumferential spinning and rotation of the tire sealant strips 11 become the semi-liquid or gelatinous sealant material after vulcanization, and when it is spun it tends to want to flow radially outwardly, as such shorter inclined barrier walls 9c are sufficient to entrap the sealant 11 in its location sufficiently to keep the sealant material in its proper compartmental strip zone 20, 21, 22. This is extremely important in that if the sealant is free to move as in the prior art of FIG. 2, all of the sealant during driving conditions would tend to rotate to the center of the tire as it revolves. This would result in a very minimal amount of sealant material being left in the shoulder regions of the tire. In order to prevent this, the inclined barrier walls 9c are formed as a part of co-extrusion of the barrier layer 9 and these barrier walls 9c keep each of the spaces sufficiently filled with sealant material that should a nail puncture the tire there will be sufficient sealant material to prevent air seepage from the tire. A careful review of the barrier strip 9 shows that by having the barrier walls 9c inclined as illustrated a nail 1 puncturing the sealant 11 would be able to receive sealant from two zones due to the inclination of the barrier walls 9c. This ability to receive a flow sealant as shown ensures that the tire 2 will be adequately sealed should a puncture occur that strikes near or adjacent the barrier walls 9c. If the barrier walls 9c were not inclined as shown, it would be possible for a nail to penetrate sliding against a barrier wall in such a fashion that the barrier wall would provide an open passage for air to escape from the tire 2 as the sealant 11 would be unable to get past the wall to completely surround the nail because the nail is rubbing against the barrier wall. By being inclined as illustrated it is impossible for the nail 1 not to be completely surrounded by sealant material should it puncture into the area of the inclined wall 9c. Alternatively, should the nail 1 puncture in the middle of the zone 21, the sealant strip 11 will perform more than adequately as it is directly in the path of the sealant material unobstructed by any walls or other surfaces. As shown, these zones 20, 21, 22 of sealant material formed as strips when wrapped around the tire create annular rings or hoops of sealant material. The compartmentalized barrier walls 9c enable the sealant strips 11 to stay in their proper position throughout the life of the tire. This means that the sealant material can have a thickness preferably between 0.5 cm and 4 cm or less. The less amount of sealant material used in the assembly 10 means that the tire 2 will provide sufficient nail puncture resistance while minimizing the amount of additional weight added to the tire 2. This enables the compartmentalized sealant strip barrier assembly 10 to be manufactured in a cost efficient manner in regards to its overall material usage.

Figure 3B:
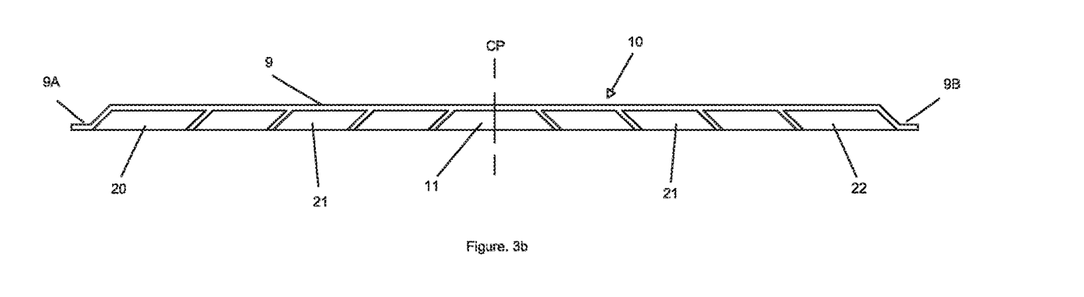
FIG. 3b is a cross sectional view of a second embodiment of the sealant and barrier assembly.

With reference to FIG. 3b, a second embodiment of the tire is shown where additional sealant strips 11 are employed. In this embodiment, the axially outer sealant strip zones 20 and 22 are illustrated with seven intermediate strip zones 21 provided. While this number can vary for each tire 2, it is sufficient to note that all of these can be assembled in a simple one step co-extrusion process that is described hereafter.

Figure 4:
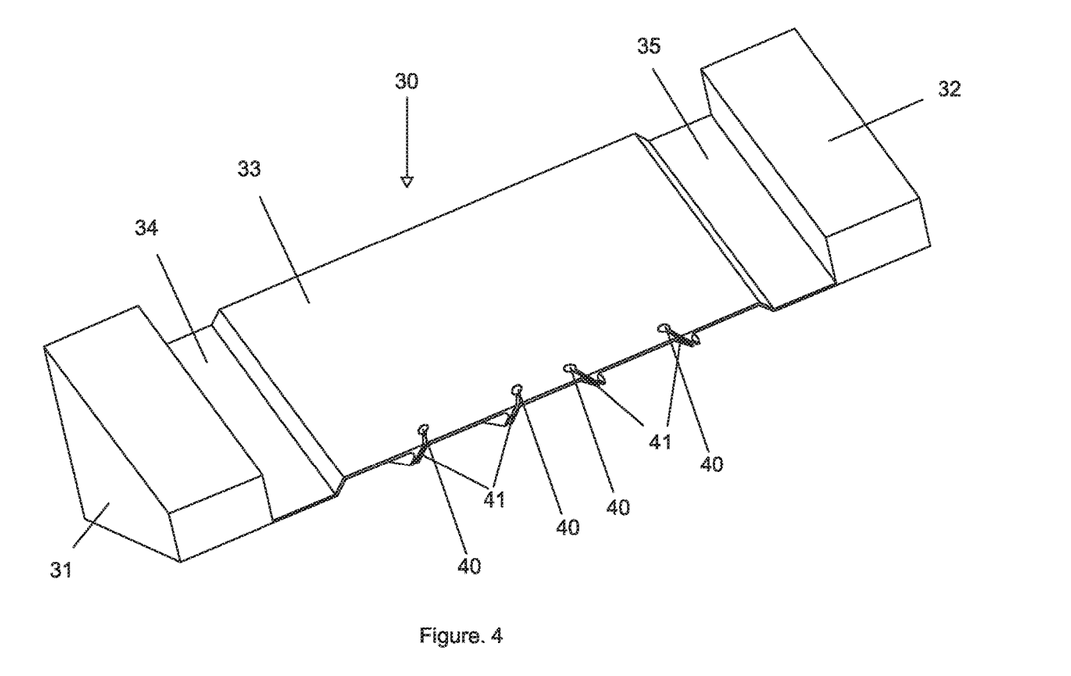
FIGS. 4-7 are various views of an extruder die for forming the present invention sealant strip and barrier assembly

The illustrated compartmentalized sealant strip and barrier assembly 10 is best manufactured by a dual co-extrusion process. This co-extrusion process requires a unique die 30 to be provided. This die 30 is best illustrated in FIGS. 4-7. With reference to FIG. 4 a perspective view of the die 30 is shown. A pair of lateral die ends 31, 32 are shown. In between the die ends 31, 32 is an upper surface 33, this upper surface 33 forms the barrier layer 9 profile as shown. This barrier layer profile also forms the pair of lateral edges 9a and 9b which are formed in depressions 34, 35 in the die. These depressions 34, 35 can step up to the flat surface 33 extending between the lateral depressions 34, 35 these features combined form the profile for overall barrier layer 9 in the die 30. At an outlet portion of the die 30 downstream the barrier material will pass over a plurality of openings or holes 40. These holes 40 project inwardly from the die surface 33 and allow barrier material to flow into them, each of these holes 40 extend to form channels or slots 41 that are inclined relative to the upper surface 33 of the die 30. These inclined channels 41 allow barrier material to flow in to form the barrier walls 9c of the co-extruded assembly 10 as the barrier material passes through the die 30 over the surface 33.

Figure 5:
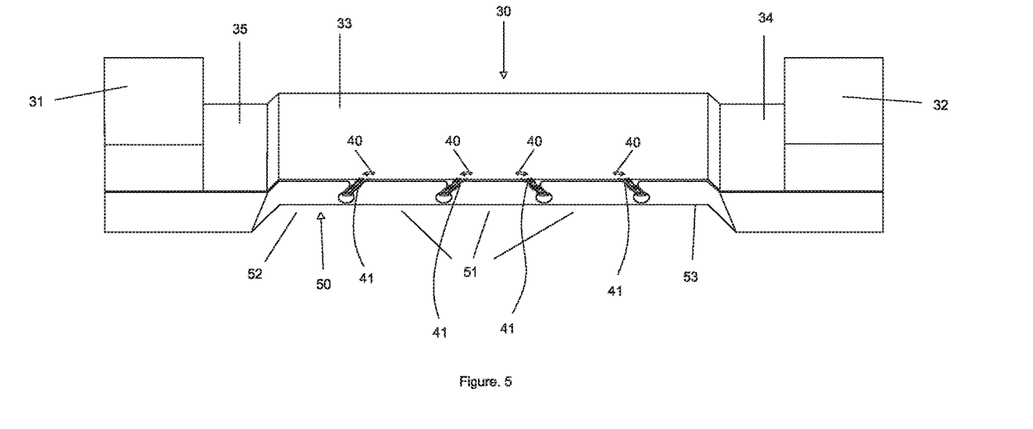
Figure 6:
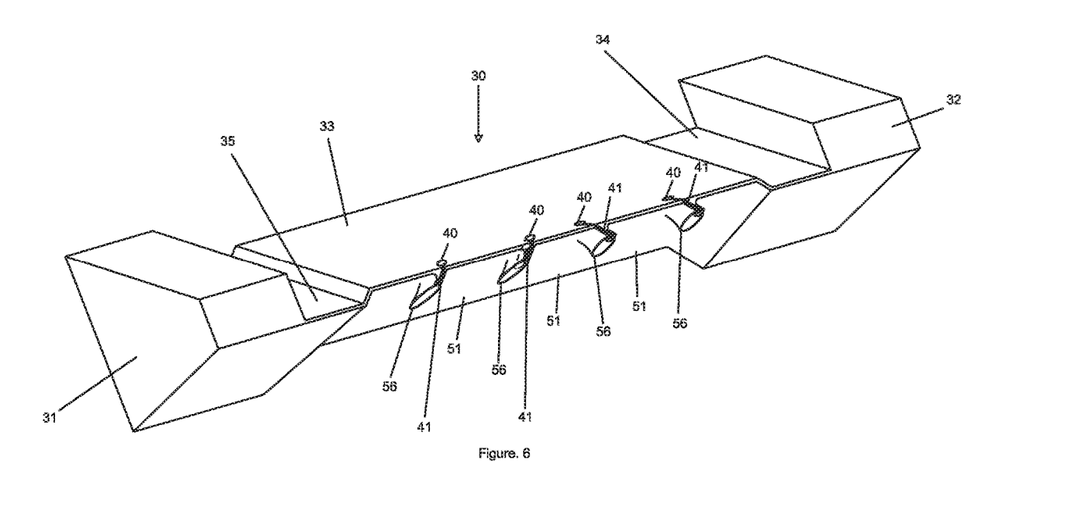
Figure 7:
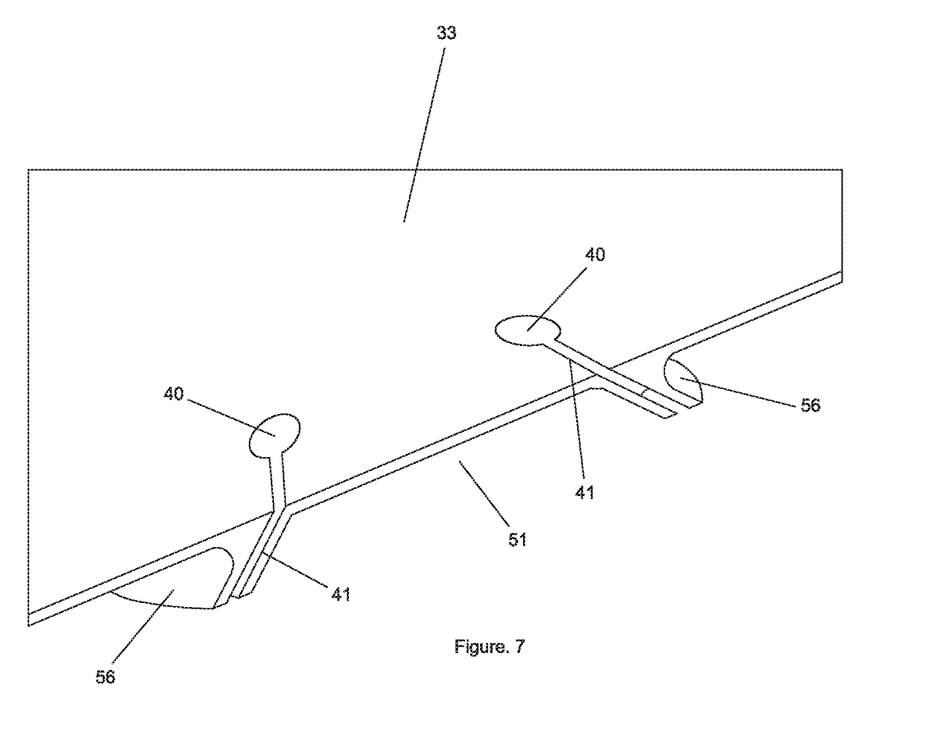

With reference to FIG. 5, a frontal view of the die 30 is shown wherein the lower surface 50 of the die 30 is illustrated showing that forms the die profile where the sealant material will pass to form the sealant strips 11 as they pass through a plurality of spaces 51 and lateral extremes 52, 53. These lateral extremes 52, 53 are profile depressions that allow the axially outermost sealant strips 20, 22 to be formed wherein the intermediate zones 21 between the barrier wall 9c forming channels 41 are illustrated by the profile space 51 which form the intermediate sealant strips 21 in the finished assembly 10. In order to accomplish this co-extrusion of the barrier layer 9 with inclined barrier walls 9c it is important that the channels or slits 41 producing the barrier walls 9c be protected so they do not occlude with sealant material. To achieve this the die 30 is constructed with channel flow dividers 56 that project outwardly upstream of the slits 41 in such a fashion that the sealant material will be smoothly diverted around these carved projection surfaces of the flow diverters 56 as the sealant material flows past surrounding the downstream slit 41 directly below the flow divider 56 as the barrier walls 9c as they are being formed such that the sealant strips 11 simultaneously will fill the void spaces 51, 52 and 53 between the barrier layer 9 and the inclined walls 9c forming the plurality of sealant strips 11. These projections or flow dividers 56 are profiled as shown in an enlarged view in FIG. 7 of the die 30. As shown in FIG. 7, the barrier material will flow down into the holes 40 filling the channel or slit 41 and the sealant material coming from the lower side will be diverted around the flow divider 56 projections in such a fashion that the sealant 11 will flow back onto the inclined walls 9c as they are formed insuring that the entire assembly 10 is produced in a dual extrusion creating both the barrier layer 9 with inclined walls 9c and sealant strips 11 as a simple co-extruded compartmentalized strip and barrier assembly 10 according to the present invention.

Figure 8:
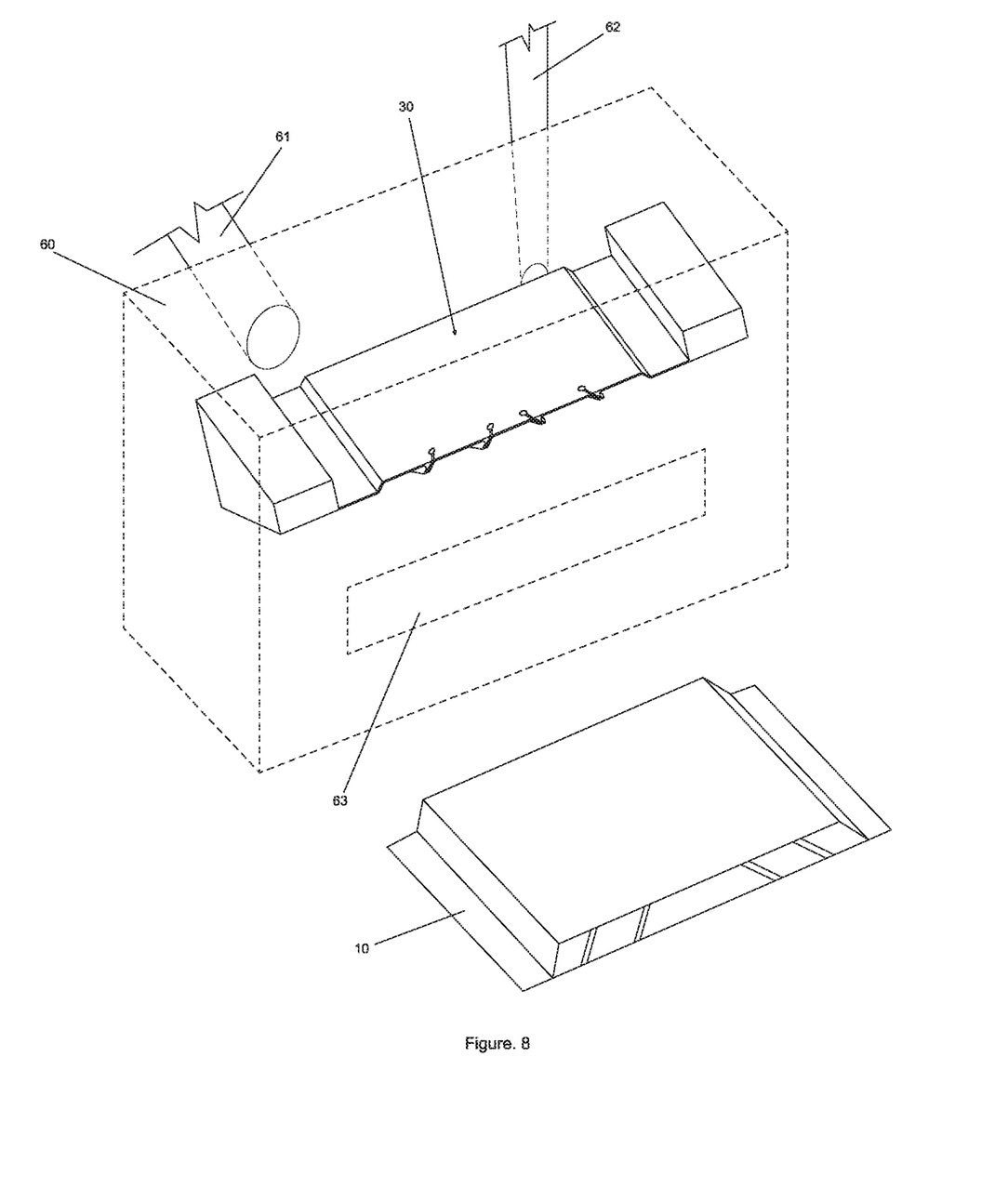
FIG. 8 is a perspective view of the extruder die in a die head or holder showing the forming of the compartmentalized sealant strip and barrier assembly.

With reference to FIG. 8, the die 30 is shown encased in phantom lines representing the extrusion head holding the die 30. The extrusion head 60 has two feed nozzles 61, 62. One feed nozzle 61 for feeding the barrier material to form the barrier layer 9 within inclined barrier walls 9c as a top surface of the assembly 10 and the second extrusion nozzle 62 providing the sealant material which is shown feeding under the die 30 to form the sealant strips 11. As shown, the output end of the die head has an opening 63 through which a portion of the assembled co-extruded compartmentalized sealant and barrier assembly 10 is shown coming from the opening 63. This figure is exemplary of how the compartmentalized sealant strip and barrier assembly 10 is formed as a co-extrusion. Alternatively, it may be such that the die 30 is flipped to form the barrier as a lower surface during extrusion and then have the assembly 10 flipped at the tire building station to insure the barrier layer with inclined walls is the top or upper layer of the assembly 10.

While certain representative embodiments and details have been shown for the purpose of illustrating the invention, it will be appreciated there is still in the art various changes and modifications may be made therein without departing from the spirit or scope of the invention.

What is claimed is:

1. An apparatus for forming a compartmentalized sealant strip and barrier assembly including a barrier layer, barrier walls and a plurality of sealant strips, the apparatus comprises:
   a puncture sealant material for forming a seal around a puncture;
   a non-sealant elastomeric material forming the barrier layer and the barrier walls;
   an extrusion die having an upper surface profile forming the barrier layer, the upper surface profile including a plurality of holes extending inwardly, each hole having a slit open to a downstream direction, the holes and slits provide wall forming openings in a lower surface profile forming the barrier walls, the lower surface profile forming the plurality of sealant strips along an axis, the lower surface profile has a plurality of intermediate spaces or zones and lateral extremes, the lateral extremes being profile depressions that form axially outermost sealant strips of the plurality of sealant strips along the axis, the intermediate zones or spaces form intermediate sealant strips of the plurality of sealant strips and are defined by spaces between the wall forming openings, wherein each slit is downstream of a flow dividing projection, the flow dividing projections separate the puncture sealant material into the plurality of sealant strips prior to passing the slits, wherein the slits are inclined relative to the upper surface profile to form angled barrier walls.

2. The apparatus of claim 1 wherein the slits are inclined from the upper surface profile extending axially along a respective slit axis toward the lower surface profile.

3. The apparatus of claim 1 wherein the plurality of intermediate spaces or zones and lateral extremes includes a first lateral extreme and an opposed second lateral extreme and three intermediate spaces or zones for forming sealant strips separated by four wall forming slits.

* * * * *